C. P. SESTER.
AWNING ATTACHMENT.
APPLICATION FILED MAY 14, 1908.
970,959.
Patented Sept. 20, 1910.
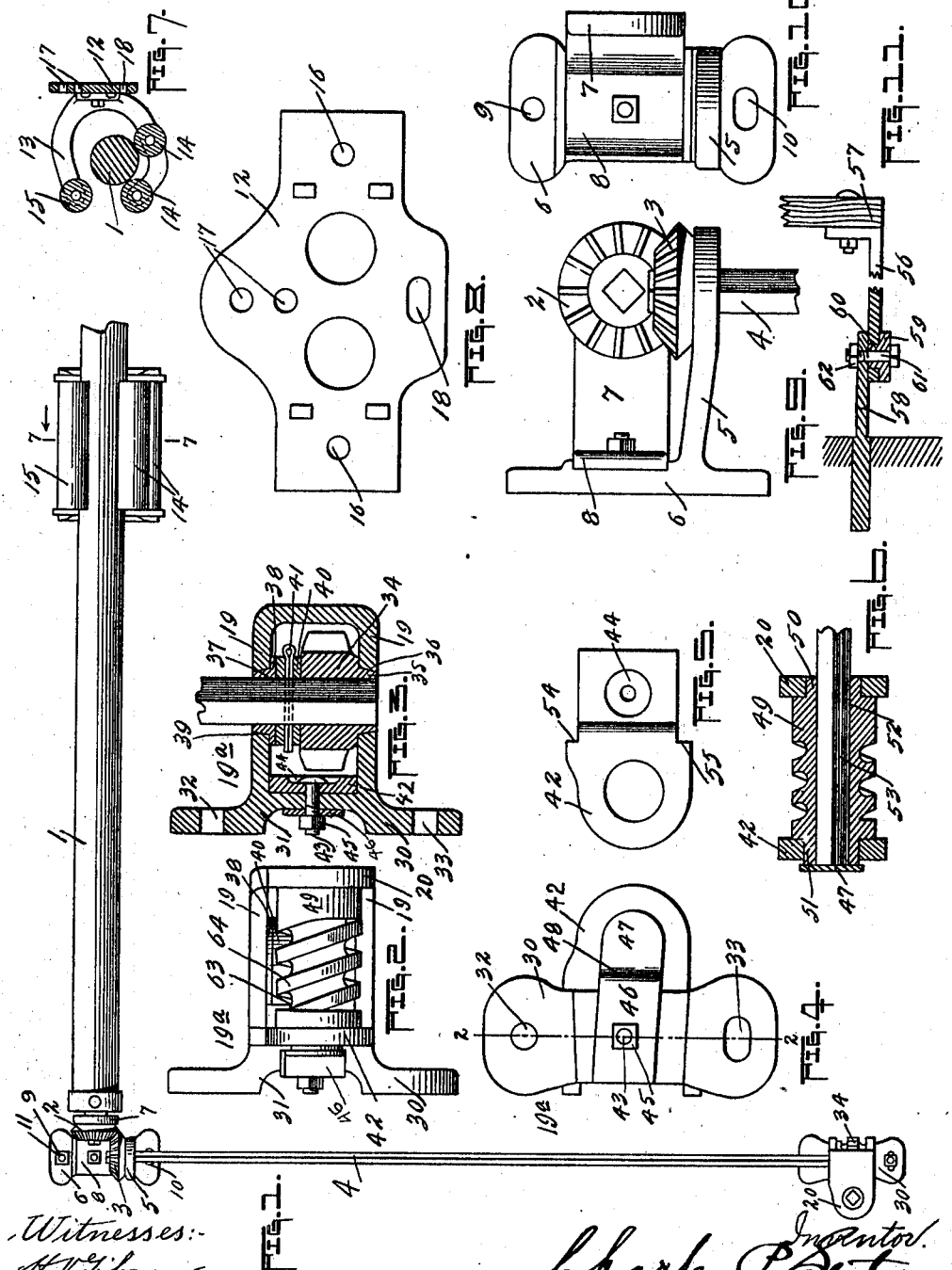

UNITED STATES PATENT OFFICE.

CHARLES P. SESTER, OF PEORIA, ILLINOIS.

AWNING ATTACHMENT.

970,959.  Specification of Letters Patent. Patented Sept. 20, 1910.

Application filed May 14, 1908. Serial No. 432,942.

*To all whom it may concern:*

Be it known that I, CHARLES P. SESTER, a citizen of the United States, residing at Peoria, in the county of Peoria and State of Illinois, have invented certain new and useful Improvements in Awning Attachments; and I do hereby declare that the following is a full, clear, and exact description of the invention, which will enable others skilled in the art to which it appertains to make and use the same.

This invention has reference to certain new and useful improvements in awnings, and relates particularly to the operating means for actuating the awning roller; to the central support for said roller, also the connection or support for the inner ends of the side-bars which support the bar to which the canvas of the awning is attached.

Further objects and aims of the invention will more fully appear from the following description and drawings forming a part thereof, in which—

Figure 1 is a front elevation of a portion of the awning roller and the mechanism connected with one end thereof, for operating said roller; Fig. 2 is an enlarged side elevation of a bracket and gearing contained therein; Fig. 3 is a sectional view as the same would appear if taken on the line 2—2 Fig. 4, with a portion of the operating shaft included in the figure; Fig. 4 is a rear elevation of the bracket shown in Fig. 2; Fig. 5 is a detached view of a bearing plate for the bracket seen in Figs. 2 and 4; Fig. 6 is a longitudinal sectional view through the worm and bearing therefor, seen in Fig. 2; Fig. 7 is a cross section, as the same would appear if taken on the line 7—7, Fig. 1; Fig. 8 is an enlarged face view of the backing plate to which are secured the arms which form bearings for the anti-friction rollers of the central support; Fig. 9 is an enlarged detail view of the gearing and support therefor, which connects the upper end of the operating shaft and awning roller; Fig. 10 is a face view of the gearing support seen in Fig. 9, omitting the gearing, and Fig. 11 is a detail view, partly in section of the supporting connection for the side rods which support the bar to which is attached the canvas of the awning.

Like numerals of reference indicate corresponding parts throughout the figures.

The awning roller is indicated as 1, which may be of any suitable length and diameter and is driven from one end; this end of the roller and the operating means therefor is shown, but the support or bearing for the opposite end of said roller is omitted, as any suitable support for the purpose may be provided. The driven end of the roller 1 carries a gear wheel 2 in mesh with a gear wheel 3 mounted on the upper end of an operating shaft 4, preferably square, which at its upper end has a bearing in the horizontal arm portion 5 of a bracket or plate 6 designed to be attached to a building, while the driven end of the awning roller passes through and has bearing in an arm 7 having a right angle extension 8 bolted to the bracket or plate 6. For attaching said bracket or plate 6 to a building, it has the perforation 9 at its upper end and the transverse slot 10 at its lower end. Through the perforation 9, a bolt 11 is passed and secured in the wall of a building and a bolt (not shown) is passed through the slot 10 and secured in a building; the slot allowing for the sidewise adjustment of the bracket or plate 6, on the bolt 11 to provide for properly alining the awning roller. Constructing the bearing for the gear wheels 2 and 3 in the manner just described, enables me to use this bearing either right or left, by releasing the bolt securing the arm 7 and reversing the position of said arm.

The central support for the awning roller 1, comprises the supporting plate 12, adapted to be secured to the wall of a building in a manner to be described, the supporting arms 13, the anti-friction rollers 14 and guide roller 15 which are supported by the arms 13, see Fig. 7. The plate 12 has the side perforations 16, the upper overlying perforations 17 and the lower longitudinal slot 18. The plate 12 is secured to the wall of a building, by first passing a bolt through either of the perforations 17 and the slot 18, when in proper position so that proper alinement may be made of the roller 1 and the rollers 14 for supporting said roller 1 central thereof, the bolts in the perforation 17 and slot 18 are made secure and additional bolts passed through the perforations 16, the slot 18, allowing for the sidewise adjustment of the plate 12 on the bolt which is passed through the perforation 17. The arms 13 for supporting the anti-friction rollers 14 and guide rollers 15 are shown detachable from the plate 12.

My object in having the arms 13, detachable, is to obviate the necessity of having to pass the roller 1 through the arms 13 between the rollers 14 and 15 after they have been positioned, which is a common fault with all if not nearly all awning attachments. With my attachments, the roller 1 may be first adjusted, and then after the plate 12 has been secured, the arms 13 may be fixed in position and the rollers 14 and 15 alined to properly sustain said roller 1 and guide the awning canvas.

The lower end of the operating shaft 4 extends down through the overlying yoke-portions 19, of a bracket 19ª, see Fig. 3 which unite at their outer ends in the transverse bearing plate 20, see Fig. 1, whereas their inner ends unite in the supporting plate 30, see Figs. 2, 3 and 4 which is channeled out on its rear face, as at 31, and at or near its upper end has the perforation 32, while at or near its lower end is provided with the transverse slot 33. In the yoke of the bracket 19ª, formed by the overlying portions 19, I mount a worm wheel 34. To insert this wheel in the yoke and then pass the shaft 4 therethrough, I provide the wheel with a hub projection 35 on its lower side which has bearing in the opening 36 in the lower yoke-portion 19, then I insert a bushing 37, which has a flange 38, in the opening 39 in the upper yoke-portion 19 and between the bushing 37 and wheel 34 is interposed a washer 40. After placing the wheel 34, bushing 37 and washer 40 in their respective relative positions, the shaft 4 is passed down through, bushing, washer and wheels, as shown in Fig. 3 and the parts held against displacement by a cotter-pin 41, passed through the washer 40 and shaft 4, as also seen in Fig. 3.

42 denotes a bearing plate, which is similar in outline to the transverse bearing plate 20 of the bracket 19ª with which the yoke-portions 19 are united, which in fact, together with the portions 19 serve in forming the yoke of the bracket 19ª, in which the wheel 34 is mounted. However, this bearing plate 42 is adapted to be detachably connected with the bracket 19ª, by being inserted between the portions 19, adjacent to the supporting plate 30, see Fig. 3 and is bolted to said plate, by a bolt 43 which passes through the plates 42 and 30 and has its head seated in a depression 44 in the inner face of the plate 42, as seen. Before securing the bolt 43 in place by the nut 45, a friction bearing plate 46 is slipped over said bolt, as seen in Figs. 3 and 4, with the free end 47 of the plate 46 extending out beyond one side of the plate 30 and bent inwardly at 48 to bring the outer portion thereof in proximity to the outer face of the bearing plate 42. The object of a detachable bearing plate, such as 42, and the friction bearing plate 46 will now be explained.

The worm-wheel 34 is operated by a worm 49, in mesh therewith, and this worm has reduced hub portions 50 and 51 journaled respectively in the bearing plates 20 and 42, and the worm has a square opening 52 therethrough, whereby the shank 53 of a crank arm, not shown, may be inserted in said worm when it is desired to operate the worm for transmitting motion to the shaft 4 through worm-wheel 34, for operating the awning roller 1 through the gears 2 and 3, described.

A worm and worm-wheel of the usual construction and under ordinary conditions will form a lock of themselves without the aid of additional means for holding the same against rotation, but in the present instance, where the worm is provided with two threads, as will be described, the wheels will not become locked when released, hence it is necessary to employ suitable means for locking the wheels against rotation for holding the awning in whatever position it may be placed, raised or lowered. To do this, I employ what I have described as the friction bearing plate 46 which is preferably a spring plate adapted to engage and bear against the hub portion 51 of the worm 49, see Fig. 6, with just sufficient pressure to hold the worm against turning, and yet not so much as will make it hard to turn said worm when it is desired to operate the same by a crank, as explained, and not only does the friction bearing plate 42 have the function just described, but it also has a tendency to hold the worm projected one way, as it is well known that a worm will wear in one direction and become loose, but with the plate 42, I obviate all this.

If the plate 42 was integral with the bracket 19ª, it would be impossible to place the worm in position in said bracket, but by making the plate 42 detachable, the worm may have its hub portion 50 inserted in its bearing in the plate 20, then the plate 42 may be secured in place, in the position seen in the figures. To prevent oscillation of this plate 42 after it is secured in position, it is provided with the shoulder portions 54 and 55 which bear against the upper and lower yoke-portions 19 of the bracket 19ª.

Providing the supporting plate 30 with the perforation 32 and the slot 33 enables me to pass a bolt through both the perforation and slot and secure the same in the wall of a building and at the same time allows for sidewise motion of the lower end of said plate, on the bolt through the perforation 32, so as to obtain a proper adjustment of the bracket 19ª and perfect alinement of the shaft 4.

The side bars for the awning are referred to as 56, although only one is shown, being the bars to which are connected the bar 57 to which is attached the lower edge of the canvas of the awning. The connection of the side bars 56 with the building or other place, is made with a bar 58, adapted to be secured in the wall of the building and project therefrom as shown in Fig. 11. The manner of making the connection between bars 56 and 58 is by providing a washer 59 having a boss 60. The inner end of the bar 56 is slipped onto the boss 60, between the bar 58 and washer proper and a bolt 61 is then passed through the washer and its boss and the bar 58 and secured in position by a nut 62. The raising and lowering of the outer end of the bar 56, is then upon the boss 60 of the washer 59, as will be understood by reference to Fig. 11.

The bracket 19ª may be used either right or left, simply by turning the bracket, end for end.

It is not new to employ a worm and worm wheel for operating the roller of an awning, but I believe I am the first to employ a worm such as I show. This worm has two threads, which are indicated as 63 and 64. A worm with only one thread is very slow in its operation and for this reason undesirable, as one revolution of the worm will move only one tooth of the worm-wheel, but with a worm having two threads, two teeth of the worm-wheel are moved with each revolution of the worm and therefore produces a practical operating means and will operate as fast as is desirable in an apparatus of this character.

Having thus fully described my invention, what I claim and desire to secure by Letters Patent of the United States, is:—

1. A center support for an awning roller, comprising a base plate having perforations at its opposite ends, through which bolts may be passed, a plurality of perforations in the upper central portion thereof, through which a bolt or bolts may be passed, and with a transverse elongated slot in the lower central portion thereof, also through which a bolt may be passed, a pair of U-shaped arms adapted to be bolted to the said plate by passing bolts through the arcuate portions thereof, and the perforations at the opposite ends of the plate, and anti-friction and guide rollers adapted to be supported by said arms by being connected to the upper and lower extensions thereof.

2. In combination, a bracket having a yoke of overlying portions, a worm-wheel provided with a hub on one side having a bearing in the lower portion of the yoke, a bushing having a bearing in the upper portion of the yoke, a washer interposed between wheel and bushing, and means for operatively uniting the wheel, bushing and washer.

3. In combination, a bracket having a yoke of overlying portions, a worm-wheel provided with a hub on one side having a bearing in the lower portion of the yoke, a bushing having a bearing in the upper portion of the yoke, a washer interposed between wheel and bushing, a shaft adapted to pass through the bushing, washer and wheel, a cotter pin adapted to be passed through the washer and shaft for operatively uniting the wheel, bushing and washer.

4. In combination, a bracket having a yoke of overlying portions, a worm-wheel provided with a hub on one side having a bearing in the lower portion of the yoke, a bushing having a bearing in the upper portion of the yoke, a washer interposed between wheel and bushing, a shaft adapted to pass through the bushing, washer and wheel, a cotter pin adapted to be passed through the washer and shaft for operatively uniting the wheel, bushing and washer, and a worm operatively mounted in said bracket, in mesh with said worm-wheel.

5. In combination, a bracket provided with over and underlying portions of a yoke and a bearing plate integral therewith, a worm-wheel having a suitable bearing between the over and underlying portions of said yoke, a bearing plate adapted to have a detachable connection with said bracket, a worm adapted to have a bearing between the bearing plate of the yoke and said detachable bearing plate and in mesh with said worm-wheel, and a friction bearing plate bearing against one end of said worm.

6. In combination, a bracket provided with over and underlying portions of a yoke and a bearing plate integral therewith and extending at right angles thereto, a worm-wheel suitably journaled between the over and underlying portions of said yoke, a bearing plate adapted to have a detachable connection with said bracket, and corresponding to but spaced apart from the bearing plate aforesaid, integral with the bracket, and a worm adapted to have a bearing between the integral and detachable bearing plates of the yoke, and in mesh with said worm-wheel.

7. In combination, a bracket provided with over and underlying portions of a yoke and a bearing plate integral therewith and extending at right angles thereto, a gear wheel suitably journaled between the over and underlying portions of said yoke, a bearing plate adapted to have a detachable connection with said bracket, and corresponding to but spaced apart from the bearing plate aforesaid, integral with said bracket, a second gear wheel adapted to have a bearing between the integral and detachable bearing plates of the yoke, and in mesh with said first mentioned gear, and a plate secured at one end of the bracket and having its opposite end bearing against said second gear for frictionally holding said second gear against rotation.

8. In combination, a bracket, a shaft having one end journaled in said bracket, a gear wheel carried on said shaft, a pair of spaced bearing plates projecting from said bracket, a second gear, said second gear in mesh with said first mentioned gear and provided with reduced hub portions journaled respectively in said bearing plates, and a plate supported by said bracket and having a portion thereof bearing against one of the hub portions of said second gear for frictionally holding said second gear against rotation.

In testimony whereof I affix my signature, in presence of two witnesses.

CHARLES P. SESTER.

Witnesses:
   CHAS. W. LA PORTE,
   LAURA E. CLAYPOOL.